United States Patent
Najewicz et al.

(10) Patent No.: US 9,014,864 B2
(45) Date of Patent: Apr. 21, 2015

(54) AGGREGATE LOAD MANAGEMENT AT A SYSTEM LEVEL

(75) Inventors: David Joseph Najewicz, Prospect, KY (US); Charles Ray Smith, Simpsonville, KY (US); Jeff Donald Drake, Louisville, KY (US); William Jerome Burke, Louisville, KY (US)

(73) Assignee: General Electric Company, Schenectady, NY (US)

( * ) Notice: Subject to any disclaimer, the term of this patent is extended or adjusted under 35 U.S.C. 154(b) by 515 days.

(21) Appl. No.: 13/402,403

(22) Filed: Feb. 22, 2012

(65) Prior Publication Data

US 2013/0218360 A1    Aug. 22, 2013

(51) Int. Cl.
*G05D 3/12* (2006.01)
*G05B 13/02* (2006.01)
*G01M 1/38* (2006.01)
*G06F 19/00* (2011.01)
*G06Q 50/06* (2012.01)

(52) U.S. Cl.
CPC .............. *G06F 19/00* (2013.01); *G06Q 50/06* (2013.01)

(58) Field of Classification Search
USPC ........ 700/48, 49, 50, 275, 286, 291, 295, 297
See application file for complete search history.

(56) References Cited

U.S. PATENT DOCUMENTS

| | | | | |
|---|---|---|---|---|
| 4,511,979 A | * | 4/1985 | Amirante | 700/296 |
| 5,168,170 A | * | 12/1992 | Hartig | 307/35 |
| 5,414,640 A | * | 5/1995 | Seem | 700/291 |
| 7,149,605 B2 | * | 12/2006 | Chassin et al. | 700/295 |
| 7,265,957 B2 | * | 9/2007 | Brucker | 361/62 |
| 2005/0033707 A1 | * | 2/2005 | Ehlers et al. | 705/412 |
| 2008/0133065 A1 | * | 6/2008 | Cannon et al. | 700/295 |
| 2009/0240380 A1 | * | 9/2009 | Shah et al. | 700/295 |
| 2010/0070103 A1 | * | 3/2010 | Fleck et al. | 700/296 |
| 2011/0066300 A1 | * | 3/2011 | Tyagi et al. | 700/291 |
| 2012/0323382 A1 | * | 12/2012 | Kamel et al. | 700/286 |

OTHER PUBLICATIONS

William Burke, et al., PWM Synchronization for Intelligent Agent Scarce Resource Auction; Proceedings of the ASME 2009 Dynamic Systems and Control Conference; Oct. 12-14, 2009; pp. 6.

William Burke, et al., Low-Frequency Pulse Width Modulation Design for HVAC Compressors; Proceedings of the ASME 2009 Dynamic Systems and Control Conference; Aug. 30-Sep. 2, 2009; pp. 7.

* cited by examiner

*Primary Examiner* — Darrin Dunn
(74) *Attorney, Agent, or Firm* — Global Patent Operation; Douglas D. Zhang (57) ABSTRACT

A method for aggregate load management includes determining whether a load capacity limit within a utility power network will be exceeded, selecting an aggregated demand reduction target to remain within capacity bounds if the load capacity limit is to be exceeded, selecting a demand reduction strategy, and sending a control signal that includes a randomized PWM level, based on the strategy, to a controller in a load component of the utility system based on the reduction target. A method for component load management includes receiving a control signal from a utility system based on a utility demand reduction strategy, converting the signal into randomized PWM control of the load component in accordance therewith, receiving an updated control signal based on utility system monitoring of an aggregate load of a component of the utility system, and converting the updated signal into randomized PWM control of the load component in accordance therewith.

20 Claims, 4 Drawing Sheets

AGGREGATE LOAD MANAGEMENT AT A SYSTEM LEVEL

CROSS-REFERENCE TO RELATED APPLICATIONS

The present application is related to U.S. patent application Ser. No. 13/402,390 entitled "Synchronized PWM Randomization for Coordinated Load Management," which is filed concurrently herewith, the disclosure of which is incorporated by reference herein in its entirety.

BACKGROUND OF THE INVENTION

The subject matter disclosed herein relates generally to energy management, and more particularly to energy management at a neighborhood or system level.

Electric utilities use methods such as voltage reductions, rolling blackouts or direct load control (cycling of heating, ventilation, and air conditioning (HVAC) systems) to prevent outages during periods when energy generation cannot meet the system demand. Also, similar methods are used on a local level if the capacity of distribution system components cannot support the local demand. Such methods result in major disruption to consumers, significantly impacting their quality of life and in some cases harming equipment in homes. In addition, such methods are applied at a bulk level and cannot be adjusted to reduce power by a determined controlled amount.

BRIEF DESCRIPTION OF THE INVENTION

As described herein, the exemplary embodiments of the present invention overcome one or more disadvantages known in the art.

One aspect of the present invention relates to a method for aggregate load management. The method includes determining whether a load capacity limit within a utility power network will be exceeded, selecting an aggregated demand reduction target to remain within capacity bounds if the load capacity limit is to be exceeded, selecting a demand reduction strategy, and sending a control signal that includes a randomized pulse width modulation level, based on the strategy selected, to a controller in at least one load component of the utility system based on the reduction target.

Another aspect relates to a system for aggregate load management. The system includes at least one distinct software module, each distinct software module being embodied on a tangible computer-readable medium, a memory, and at least one processor coupled to the memory and operative for determining whether a load capacity limit within a utility power network will be exceeded, selecting an aggregated demand reduction target to remain within capacity bounds if the load capacity limit is to be exceeded, selecting a demand reduction strategy, and sending a control signal that includes a randomized pulse width modulation level, based on the strategy selected, to a controller in at least one load component of the utility system based on the reduction target.

Yet another aspect of the present invention relates to a method for load management at a component level. The method includes receiving, via a controller in a load component, a control signal from a utility system based on a utility demand reduction strategy, converting the control signal into a randomized pulse width modulation control of the load component in accordance with the control signal, receiving, via the controller in the load component, an updated control signal from the utility system based on utility system monitoring of an aggregate load of at least one component of the utility system, and converting the updated control signal into a randomized pulse width modulation control of the load component in accordance with the updated control signal.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF THE EXEMPLARY EMBODIMENTS OF THE INVENTION

As described herein, one or more embodiments of the invention include application of a low frequency pulse width modulation (PWM) method for aggregate load management at a neighborhood or system level. As detailed herein, power consuming devices that are generally either off or on for a period of time (e.g., a heating, ventilation, and air conditioning compressor, a water heater, an irrigation pump, a pool pump, etc.) can be controlled using low frequency PWM control (also referred to herein as duty cycle control). Time is divided into control periods having a generally fixed period on the order of minutes and a controller determines how long a power consuming device is to be operated (i.e., turned-on) during each control period to achieve a desired result, such as a desired temperature. The percentage of a control period during which a power consuming device is turned on is referred to as the duty cycle at which the device is operated. Embodiments described herein enable limiting of a duty cycle of such a power consuming device (i.e., saturating the power control signal at a value less than 100% of maximum power), and randomizing the start times of the control periods of the power consuming devices.

As used herein, control signal refers to the entire signal coming from a utility (or energy manager component) which includes a PWM level or saturation level (0-100%) and may also include start, stop and duration times. PWM or saturation level refers to the level or percentage to which the duty cycle is set. Further, the PWM period refers to the period of the square wave cycling of PWM on and off, and the control period/time refers to the starting time and duration the PWM or saturation signal is to be applied to one or more various loads.

An aspect of the invention utilizes an advanced metering infrastructure (AMI) system or alternative communication pathway to communicate the level and nature of loads to a central controller, for example, a demand reduction management system (DRMS). The DRMS then determines the amount and type of loads that could be reduced and sends a control signal to those groups (down to the individual residence level) to reduce load. The control signal can result in a reduction of the load in the residence (or a component thereof) on an intermittent (for example, PWM) basis. By implementing control based on location (feeder, neighborhood, etc.) or magnitude of load capable of being reduced, the impact of the demand reduction event can be minimized, for example, to the number of residences, and the magnitude of the impact can also be controlled.

Figure 1:
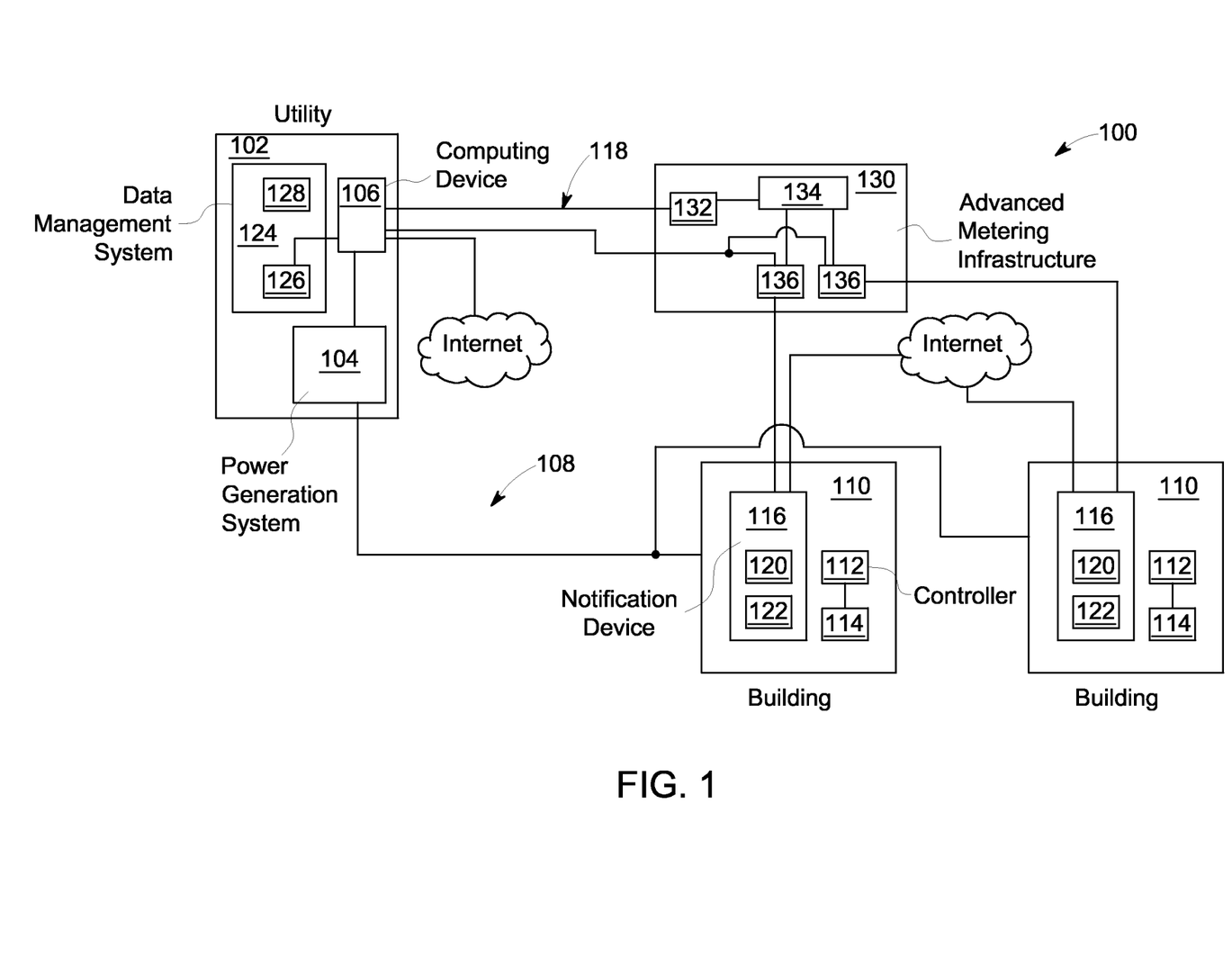
FIG. 1 is a block diagram of an exemplary demand response system.

FIG. 1 illustrates a demand response system 100. In the exemplary embodiment, demand response system 100 includes a utility 102. Utility 102 includes an electric power generation system 104 and a computing device 106. Computing device 106 (such as, for example, a DRMS as detailed herein) is described in more detail below with respect to FIG. 2.

Computing device 106 enables utility 102 to communicate with customers and electric power generation system 104 supplies electrical power to customers via an electric network 108. Electric power generation system 104 may include a generator driven by, for example, a gas turbine engine, a hydroelectric turbine, a wind turbine, one or more solar panels, and/or another suitable generation system. In other embodiments, electric power generation system 104 may be positioned at a different location from computing device 106 and/or computing device 106 may not be positioned within utility 102 and may be positioned external to utility 102.

In the exemplary embodiment, computing device 106 is communicatively coupled to a plurality of buildings 110, which may be occupied by a plurality of customers. It should be noted that, as used herein, the term "couple" is not limited to a direct mechanical, electrical, and/or communication connection between components, but may also include an indirect mechanical, electrical, and/or communication connection between multiple components.

In the exemplary embodiment, electric power generation system 104 is coupled to buildings 110 via electric network 108 to provide power to buildings 110. More specifically, each building includes a controller 112 coupled to one or more power consuming devices 114. Controller 112 (such as, for example, a home energy manager (HEM) as detailed herein) is communicatively coupled to utility 102 and controls operation of power consuming device 114. Controller 112 is described in more detail below with respect to FIG. 3. Power consuming devices 114 may be any type of device that consumes electrical power including, for example, an electric water heater, an air conditioner, a pool pump, an electric dryer, etc.

In the illustrated embodiment, electric network 108 is illustrated in a single line diagram. Electric network 108 may, however, include multiple wires carrying multiple phases of electric power and buildings 110 may be connected to different phases of electric power. Further, electric network 108 may include additional elements including, for example, transformers, substations, switches, nodes, etc.

In the exemplary embodiment, computing device 106 is communicatively coupled to at least one user notification device 116 within each building 110 via a network 118 such that computing device 106 may communicate with user notification device 116. Network 118 (which can be wired or wireless) may include a private network, a public network, the Internet, etc. In the exemplary embodiment, user notification device 116 may be a computer, a cellular phone, and/or a smart device, including a smart box and/or smart thermostat. Alternatively, user notification device 116 may be any other device that is configured to communicate with computing device 106. Moreover, in the exemplary embodiment, user notification device 116 may be a home automation system. User notification device 116 includes a user interface 120 that receives at least one input from a user, such as a customer of utility 102. In other embodiments, user notification device 116 may not include user interface 120. In the exemplary embodiment, user interface 120 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone) that enables the user to input pertinent information.

Moreover, in the exemplary embodiment, user notification device 116 includes a presentation interface 122 that presents information, such as information regarding demand response programs and/or demand response events that are received from utility 102, input events and/or validation results, to the user. In the exemplary embodiment, presentation interface 122 includes a display adapter (not shown) that is coupled to at least one display device (not shown). More specifically, in the exemplary embodiment, the display device is a visual display device, such as a cathode ray tube (CRT), a liquid crystal display (LCD), an organic LED (OLED) display, and/or an "electronic ink" display. Alternatively, presentation interface 122 may include an audio output device (e.g., an audio adapter and/or a speaker) and/or a printer. In other embodiments, user notification device 116 may not include presentation interface 122.

In the exemplary embodiment, computing device 106 may communicate with user notification device 116 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, cellular phone technology (e.g., the Global Standard for Mobile communication (GSM)), a satellite communication link, and/or any other suitable communication means. More specifically, in the exemplary embodiment, user notification device 116 is configured to receive at least one signal from computing device 106 that is representative of at least one demand response event. In the exemplary embodiment, the demand response event initiates the implementation of a demand response program that may include a direct load control program, a critical peak pricing program, and/or a time of use program.

In the exemplary embodiment, utility 102 also includes a data management system 124 that is coupled to computing device 106. Data management system 124 may be any device capable of accessing network 118 including, without limitation, a desktop computer, a laptop computer, or other web-based connectable equipment. More specifically, in the exemplary embodiment, data management system 124 includes a database 126 that includes customer data for each of the customers of utility 102. In the exemplary embodiment, the customer data may include an enrollment period and/or an enrollment status for each customer for participating in at least one demand response program. For example, the data may include a selection made by each customer for at least one demand response program to participate in. The customer data may also include a participation history for each customer. The participation history may include, for example, the previous demand response events that each customer has participated in. The customer data may also include a geographic area of each customer, such as the geographic area where each customer resides. The customer data may include the phase of power utilized by each customer. The customer data may indicate what type of customer each customer is, such as commercial or residential. The customer data may indicate the types of power consuming devices used by each customer including, for example, electric water heaters, air conditioners, pool pumps, irrigation systems, electric dryers, etc.

Moreover, in the exemplary embodiment, data management system 124 includes a user interface 128 that receives at least one input from a user, such as an operator and/or employee of utility 102. In the exemplary embodiment, data management system user interface 128 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone) that enables the user to input pertinent information.

Data management system 124 may communicate with computing device 106 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, cellular phone technology (e.g., the Global Standard for Mobile communication (GSM)), a satellite communication link, and/or any other suitable communication means. More specifically, in the exemplary embodiment, data management system 124 transmits the customer data to computing device 106. While the customer data is shown as being stored in database 126 within data management system 124 in the exemplary embodiment, it should be noted that the customer data may be stored in another system and/or device. For example, computing device 106 may store the customer data therein.

In the exemplary embodiment, system 100 includes an advanced metering infrastructure (AMI) subsystem 130. AMI subsystem 130 includes a gateway 132 and a repeater 134 and AMI meters 136. Repeater 134 repeats or relays data to forward data between devices, such as computing device 106, gateway 132, AMI meters 136, user notification devices 116, etc. AMI meters 136 measure and/or detect an amount of electricity received and/or provided to one or more loads (such as power consuming devices 114) coupled to AMI meters 136. Meters 136 transmit data, such as electricity measurement data, to, and/or receive data from, other devices or systems within network 118 and/or AMI subsystem 130. Other embodiments may not include AMI subsystem 130 and/or computing device 106 may communicate directly with user notification devices, power consuming devices, etc.

In operation, power consuming devices 114 are controlled by controller 112 using a duty cycle control scheme. Most generally, the device controller operates at two independent (but coupled) time scales—one for the resource control (e.g., temperature control) and one for the PWM. The resource control usually updates at a frequency at or below the frequency of the PWM. In general, power consuming devices 114 are devices that are either on or off. The percentage of a PWM period during which a device 114 is turned-on is referred to as a duty cycle. In the exemplary embodiment, utility 102 periodically transmits a control signal that indicates the beginning of a control period. The control signal is received by controller 112 and used to establish the control period it uses to control operation of a power consuming device 114. Thus, all recipients 110 participating in the load management program have their control periods for duty cycle controlled power consuming devices 114 synchronized. Because the control periods of power consuming devices 114 in multiple recipients 110 are synchronized, load diversity may be a concern. Accordingly, controller 112 includes a randomization algorithm, resulting in synchronized PWM randomization. In the exemplary embodiment, controller 112 is operable to receive a control signal (i.e., percentage of power reduction from a predefined maximum value) from utility 102 to indicate an amount of power reduction desired by utility 102. Hence load coordination may be achieved.

Figure 2:
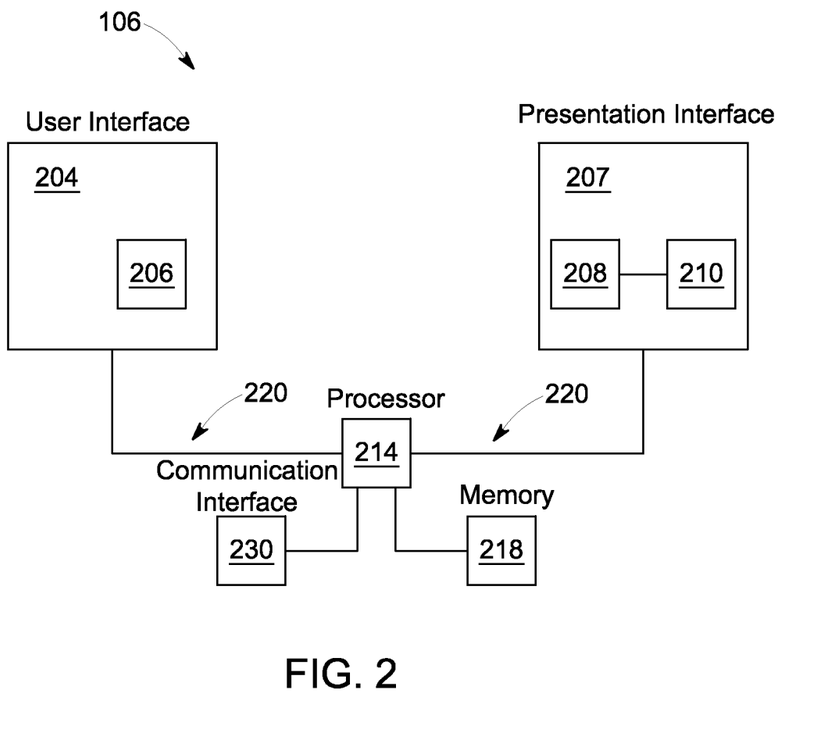
FIG. 2 is a block diagram of computing device for use in the demand response system shown in FIG. 1.

FIG. 2 is a block diagram of computing device 106. In the exemplary embodiment, computing device 106 includes a user interface 204 that receives at least one input from a user, such as an employee of utility 102 (shown in FIG. 1). In the exemplary embodiment, user interface 204 includes a keyboard 206 that enables the user to input pertinent information. Alternatively, user interface 204 may include, for example, a pointing device, a mouse, a stylus, a touch sensitive panel (e.g., a touch pad or a touch screen), a gyroscope, an accelerometer, a position detector, and/or an audio input interface (e.g., including a microphone).

Moreover, in the exemplary embodiment, computing device 106 includes a presentation interface 207 that presents information, such as input events and/or validation results, to the user. In the exemplary embodiment, presentation interface 207 includes a display adapter 208 that is coupled to at least one display device 210. More specifically, in the exemplary embodiment, display device 210 is a visual display device, such as a cathode ray tube (CRT), a liquid crystal display (LCD), an organic LED (OLED) display, and/or an "electronic ink" display. Alternatively, presentation interface 207 may include an audio output device (e.g., an audio adapter and/or a speaker) and/or a printer.

Computing device 106 also includes a processor 214 and a memory device 218. In the exemplary embodiment, processor 214 is coupled to user interface 204, presentation interface 207, and to memory device 218 via a system bus 220. In the exemplary embodiment, processor 214 communicates with the user, such as by prompting the user via presentation interface 207 and/or by receiving user inputs via user interface 204. Moreover, in the exemplary embodiment, processor 214 is programmed by encoding an operation using one or more executable instructions and providing the executable instructions in memory device 218.

Computing device 106, in the exemplary embodiment, also includes a communication interface 230 that is coupled to processor 214 via system bus 220. Moreover, in the exemplary embodiment, communication interface 230 is communicatively coupled to user notification device 116 via network 118 (shown in FIG. 1). In the exemplary embodiment, communication interface 230 communicates with user notification device 116, and/or other components within system 100.

Figure 3:
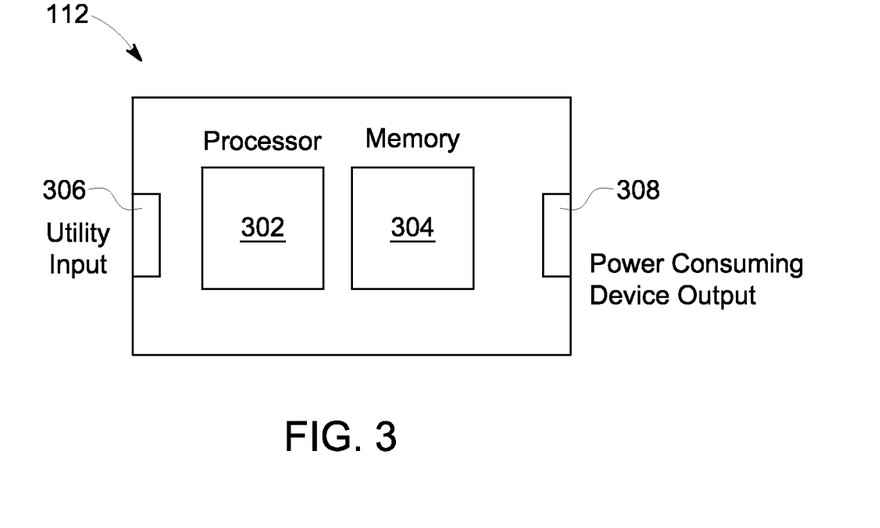
FIG. 3 is a block diagram of an exemplary controller for use in the demand response system shown in FIG. 1.

FIG. 3 illustrates an example controller 112 for controlling operation of one or more power consuming device(s) 114. In this embodiment, controller 112 includes a processor 302, a memory device 304, an input 306, and an output 308.

Controller 112 is communicatively coupled to utility 102. More specifically, input 306 couples processor 302 to utility 102. Input 306 may be communicatively coupled to utility 102 directly or via one or more intermediary devices. For example, input 306 may be coupled to utility 102 directly via the Internet, wireless communication, or any other network. Alternatively, or additionally, input 306 may be coupled to utility 102 via an intermediary, such as user notification device 116. However connected, input 306 is coupled to receive one or more signals from utility 102. Although the embodiment shown in FIG. 3 includes a single input 306, controller 112 may include any suitable number of inputs 306.

Controller 112 is coupled to one or more power consuming devices 114 via output 308. Controller 112 may thus control energization of power consuming devices 114 via output 308. Although a single output 308 is illustrated in the embodiment shown in FIG. 3, controller 112 may include any suitable number of outputs 308. For example, controller 112 may include a separate output 308 for each power consuming device 114 that it controls. In the exemplary embodiment, processor 302 is programmed by encoding an operation using one or more executable instructions and providing the executable instructions in memory device 304.

In use, power consuming devices 114 are controlled by controller 112 using a pulse width modulation control scheme. In general, power consuming devices are turned on and/or off for a portion of a control period (up to and including the entire control period), with the percentage of on time often referred to as a duty cycle or saturation level (up to and including 100%). Most generally, the controllers for power consuming devices can operate at two distinct time scales— one for the resource control and one for the PWM—with the resource control generally (but not always) operating at a lower frequency. For example, if controller 112 determines to operate one of power consuming devices 114 at a fifty percent duty cycle, controller 112 will set the PWM input to 50%. In turn, the PWM generator will turn power consuming device 114 on for half of the PWM period and will turn power consuming device 114 off for half of the PWM period. Generally, the order of the on and off portion of a PWM period does not matter; as noted herein, to preserve diversity of load, the initiation of the PWM signal will be randomized.

Unlike many devices controlled using PWM, power consuming devices 114 generally perform better if they are switched on and/or off relatively infrequently. For example, a compressor in an air conditioner generally should not be cycled off and on very frequently. Accordingly, the PWM period in the example embodiment is relatively long. Generally, the PWM period has a length measured in minutes rather than fractions of a second. In some embodiments, the PWM period is about fifteen minutes.

In the exemplary embodiment, utility 102 periodically transmits a control signal that indicates the beginning of a control period. The control signal is received by controller 112 via input 306 and used to establish the control period it uses to control operation of a power consuming device 114 using PWM, as detailed herein. Thus, all buildings 110 participating in the load management program have their control periods for controlling PWM controlled power consuming devices 114 synchronized. (As used herein, the devices 114 that are being controlled by controller 112 can be referred to as "PWM controlled power consuming devices.")

Because the control periods of power consuming devices 114 in multiple buildings 110 are synchronized, load diversity is a concern. If all devices 114 turn on (or turn off) at the beginning of a control period, electric network 108 may experience relatively large demand spikes during the control period. In general, electric network 108 relies on different loads operating asynchronously, and in particular, HVAC systems operating at random times to help minimize demand spikes. Accordingly, controller 112 includes a randomization algorithm to randomize the PWM over the control period such that load diversity is preserved and the aggregated loads are smoothly modulated.

Moreover, controller 112 is operable to receive a control signal from utility 102. The control signal is related to an amount of power reduction desired by utility 102. Generally, the control signal limits the maximum duty cycle for operation of power consuming devices 114 during a control period. Thus, utility 102 may monitor power demand during a control period and/or predict power demand during a next control period, and vary the control signal for the next control period as needed in order to maintain power demand at a desired level. Controller 112 may receive the control signal via input 306 or via a separate input (not shown).

Accordingly, as detailed further herein, an aspect of the invention includes a system to control load demand in a power system. A load controller (a DRMS, such as shown, for example in FIG. 1 as component 106) receives signals from residences (current loads) and the composition of the individual loads based on information from, for example, a Home Energy Manager (HEM) (such as show, for example in FIG. 1 as component 112). The HEM will, by virtue of the fact that it is communicating with the thermostat and all of the appliances, know what major loads are being operated. That information can be sent back to the DRMS system. Based on availability of loads suitable for reduction in each group (feeder, neighborhood, substation service area, etc.), the DRMS sends a signal to each area, requesting load curtailment based on the estimated reduction capacity. The signal sent to each group (or sub-group) is based on the synchronized PWM method described herein. This control parameter can be used in closed loop system to control the demand to a specified value for the group being managed.

The DRMS of an electric utility monitors the aggregate load at the substation, feeder and local neighborhood level. The DRMS also monitors individual residential loads, and, with home energy managers installed in each residence, can provide estimates of the types of loads in each home such as HVAC, water heating, electric vehicle (EV) charging, various appliances, etc. This estimate of a specific home use can be provided by the HEM (via either the AMI meter backhaul network or through a broad band internet protocol (IP) connection or other communication network such as cellular). Based on the need for load reduction either at the local level (overloaded feeder) or at the system level, the DRMS can issue a control signal which will cause a simultaneous low frequency (but randomized) PWM load reduction in the residences addressed by the DRMS.

The level of the signal sent to each group or sub group can be based on the information known about the load level and types of loads. For example, if a feeder is overloaded and a major component of the load is charging an electric vehicle, then a control signal with a higher saturation level will be sent to those locations with EV charging activities. Alternatively, groups or sub-groups of residences with low demand will receive a lower request for curtailment.

In addition, the DRMS system also monitors the actual load reduction observed based on the signals sent out, and if the aggregate load reduction is either too high or too low, then the signals can be adjusted to produce the desired level of demand reduction.

In another aspect of the invention, the use of the low frequency randomized PWM method to control the aggregate load of groups and sub-groups enables a controlled system load restoration at the end of a demand reduction period. By slowly increasing the load control signal (which can includes a PWM or saturation level) to a normal level, the shape and magnitude of the system response can be managed to reduce large rebound events. For example, if a utility were to turn components off completely, when the demand reduction period was over there would be much equipment that would turn back on and cause a large spike. The pulse-mode modulation technique used in an aspect of the invention allows such a scenario to be controlled such that the aggregate power transient can be controlled within acceptable limits as full power levels are restored.

As described herein, embodiments of the invention to control the demand reduction event minimize the impact on consumers. Additionally, because utilities often offer incentives for reduction in energy consumption during peak demand events, consumers could balance a desire to save money (reduce energy use during peak demand periods) with a desire not to have energy usage and lifestyle impacted.

From a utility perspective, system availability is a key evaluation parameter used by most public service commissions. The use of a DRMS system in one or more embodiments of the invention would minimize system outages and thus increase overall system availability. In addition, the ability to target specific areas to relieve system problems rather than resorting to widespread brown/blackouts provides an improvement in customer service for utilities as well.

As such, the techniques detailed herein uniquely provide the ability of a DRMS to have information on individual residences and the geographic distribution of loads thereof, and to dispatch the demand reduction (control) signal to the loads/areas that can best provide the load reduction. An aspect of the invention facilitates temporary energy reduction, and power reduction in principle, and shifting energy to some other time period. By way of example, consider a hot water heater, which is an appliance with a demand that can be reduced and generally not result in a huge immediate impact on consumers.

As described herein, a technique for accomplishing these objectives can include, for example randomized pulse-mode modulation, which includes cycling components on and off in a controlled manner to reduce the load. Controlling power demand on a network using control signals can include, for example, determining a demanded power target and transmitting a control signal to a plurality of customers. The control signal indicates the beginning of a control period. Also, the technique additionally includes transmitting a control signal (e.g., a PWM percentage or saturation level) to the plurality of customers, the control signal (PWM percentage) representing a power usage threshold for each customer during the control period. Further, the technique includes monitoring power consumption on the network during the control period, and determining whether the monitored power consumption on the network is equal to the demanded power target.

The techniques detailed herein also allow for a feedback loop; in other words, a value (for example, a percentage value) is sent out to reduce a load by the certain value, which allows the utility then to monitor whether the load actually goes down by that value (or if it goes down by a different value). A feedback loop can then be used to adjust that value to obtain the amount desired, if necessary. Such a scenario may present itself in the event that customers have the option to override a reduction (control) signal. Accordingly, an embodiment of the invention can include allowing for a continuous feedback loop so that a desired reduction level can be reached.

As noted herein, load data is monitored in real time by a HEM. Therefore, the HEM can also predict or project into the future what the power consumption of the individual loads may be based on observed historic consumer usage patterns or predicted weather conditions.

In one or more embodiments of the invention, a reduction (control) signal/message can be sent out uniformly to all residences in a neighborhood/system (that is, the same percentage reduction message can be sent to each house), or, alternatively, reduction (control) signals can be sent individually on a house-by-house basis. Each house has a unique meter number and the utility can address different reduction requests to different meters.

One aspect of the invention includes identifying certain loads that can be curtailed without creating a significant or noticeably harmful impact on the consumer (such as, for example, a dryer or a hot water heater). Accordingly, an embodiment of the invention includes prioritizing a control signal based on the projected impact on the consumer. Also, when the demand reduction event is over, using the PWM effect enables a controlled ramp-up of how components can be returned to full power such that the resulting transient spike can be controlled, and a priority list can similarly be used for this aspect. Further, a priority list (set-up and/or housed by either the utility or each HEM) can be used as a way of providing more demand reduction from one house versus another (for example, considered in terms of user defined discretionary load available to dispatch).

Consequently, in contrast to disadvantageous existing approaches, embodiments of the present invention avoid a need to shut off a load completely. A load can be cycled to keep it functioning at some reduced level to keep some level of service for the consumer. Consider, by way of example, a dryer that is functioning normally and then receives a reduce power control signal (for example, reduce average power by 50%). As a result, the load will take longer (for example, nearly twice as long, however the overall will use less overall energy) to complete the same dry cycle. However, the consumer will still get service, as the appliance will not be turned off completely. Additionally, an appliance such as a dryer may be targeted for reduction so as to not affect a more critical residential system such as lights or heat.

Figure 4:
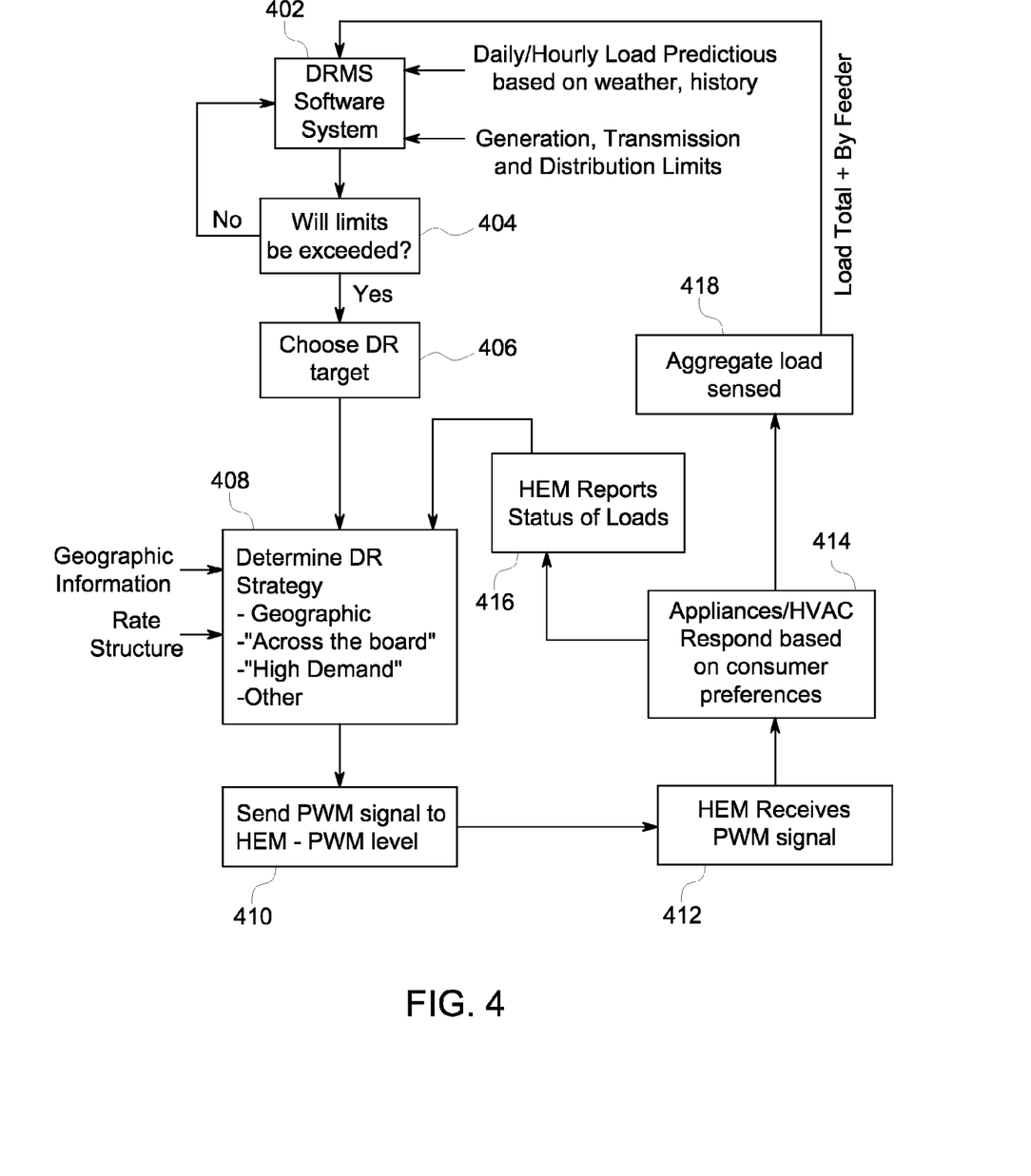
FIG. 4 is a flow chart of a method for providing a control signal, in accordance with a non-limiting exemplary embodiment of the invention.

FIG. 4 is a flow chart of a method for providing a control signal, in accordance with a non-limiting exemplary embodiment of the invention. Specifically, FIG. 4 depicts how a DRMS 402 (also illustrated, for example, in FIG. 1 as component 106) uses PWM technique to send control signals to each home energy manager (HEM) (also illustrated, for example, in FIG. 1 as component 112). In the example embodiment illustrated in FIG. 4, steps 404, 406, 408 and 410 are software steps carried out within the utility DRMS 402, steps 412, 414 and 416 are carried out by home energy manager/appliance hardware, and step 418 is performed by the utility supervisory control and data acquisition (SCADA) system (such as, for example, component 102 in FIG. 1).

Accordingly, load predictions (for example, daily or hourly predictions) based on weather, history, etc. as well as generation, transmission and distribution limits are obtained by the DRMS 402. In step 404, a determination is made as to whether a limit will be exceeded by a home, group of homes or a component of the utility system. Determining whether a load capacity limit within the utility power network will be exceeded can include analyzing generation capacity, transmission and distribution equipment capacity, geographic and power network topology information, component load information provided by a plurality of controllers, rate structure information, weather predictions and/or past history for the utility system. A load capacity limit can include a local load capacity limit and/or a global load capacity limit.

If a limit will be exceeded, then step 406 includes selecting a demand reduction (DR) target (for example, a local demand reduction target and/or a global demand reduction target). In step 408, a DR strategy is determined. Geographic information and rate structure information is input into the DRMS at step 408, and DR considerations are analyzed. Such considerations can include, for example, a uniform reduction among at least one or more component of the utility system, magnitude of current component loads, wherein one or more comparatively larger loads are targeted for comparatively larger reductions, as compared to one or more smaller loads, one or more targeting reductions of one or more specific types of loads known to exist in one or more components, geographic or network topology, and type of rate agreement with each component.

The demand reduction strategy can also be based, for example, on type of load to be reduced as selected by a consumer, wherein the consumer selects, in a controller, a preference of one or more loads to be controlled from a highest priority to a lowest priority.

Once a DR determination is made, step 410 includes sending a control signal from the DRMS to a home energy manager. (By way of example, the control signal can be a ramp signal.) In step 412, the home energy manager receives the control signal and in step 414, individual appliances/HVAC systems within homes/buildings respond to the signal. In one embodiment of the invention, the response can be based on consumer preferences via, for example, a prioritization list such as described herein. In step 416, the home energy manager reports the status of various loads to the DRMS (which can be used as input during the DR strategy determination in subsequent iterations of step 408). Further, in step 418, the aggregate load is sensed, and total load and feeder information is sent to the DRMS.

Additionally, the DRMS continues monitoring an aggregate load of the component(s) of the utility system to determine if the target reduction is achieved. If the target reduction is not achieved, the DRMS sends an updated control signal to the component(s) of the utility system until the target is achieved. Also, in one aspect of the invention, the techniques can include performing a controlled system load restoration at an end of a demand reduction period.

Figure 5:
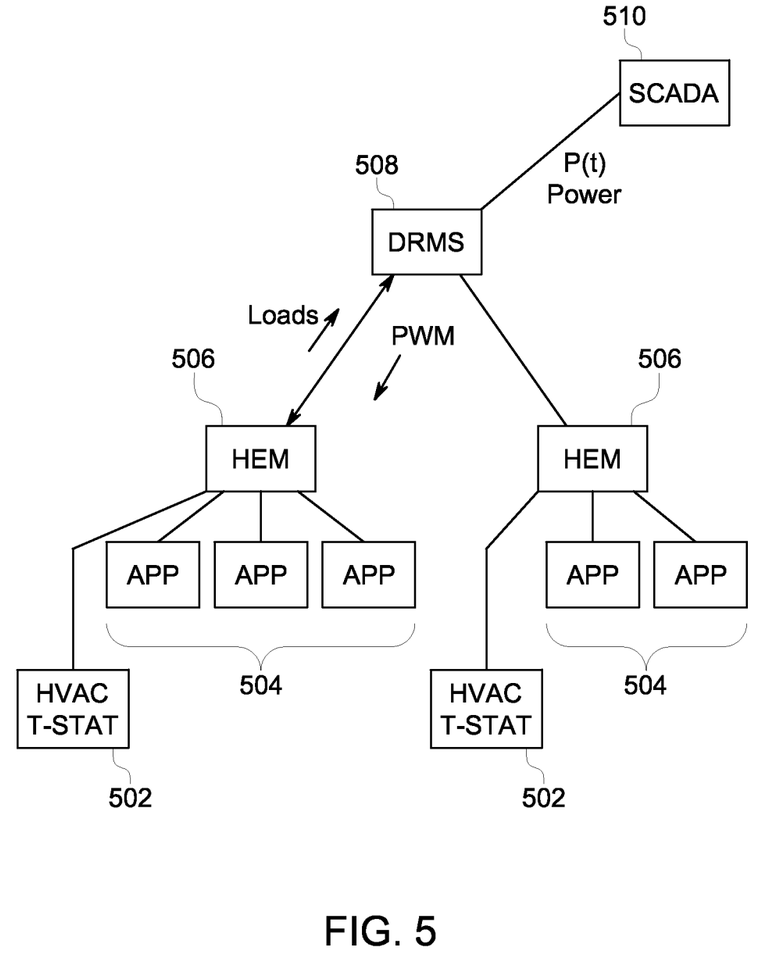
FIG. 5 is a block diagram illustrating interaction between a home energy manager, a demand response management system and a utility, in accordance with a non-limiting exemplary embodiment of the invention.

FIG. 5 is a block diagram illustrating interaction between a home energy manager (HEM) (such as, for example, component 112 in FIG. 1), a demand response management system (such as, for example, component 106 in FIG. 1) and a utility supervisory control and data acquisition (SCADA) system (such as, for example, component 102 in FIG. 1), in accordance with a non-limiting exemplary embodiment of the invention. The home energy manager 506 obtains data from appliances 504 as well as HVAC/thermostat components 502. The home energy manager sends this data regarding the available loads at each household (returned by either the utility AMI "backhaul" system or over an internet link) to the DRMS 508 and such data is aggregated by the utility SCADA system 510 at a "local" level chosen based on the nature of the backhaul. The DRMS 508 sends a control signal to the HEM 506 in accordance with the pertinent load data and aggregation determination.

One advantage that may be realized in the practice of some embodiments of the described systems and techniques is implementing control of a demand reduction based on location or magnitude of load capable of being reduced.

As used herein, the term "processor" (such as, for example component 214 in FIG. 2 and component 302 in FIG. 3) refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device (such as, for example, component 218 in FIG. 2 and component 304 in FIG. 3) includes one or more devices that enable information, such as executable instructions and/or other data, to be stored and retrieved. Moreover, in the exemplary embodiment, memory device 218 or 304 includes one or more computer readable media, such as, without limitation, dynamic random access memory (DRAM), static random access memory (SRAM), a solid state disk, and/or a hard disk. In the exemplary embodiment, memory device 218 or 304 stores, without limitation, application source code, application object code, configuration data, additional input events, application states, assertion statements, validation results, and/or any other type of data. More specifically, in the exemplary embodiment, memory device 218 or 304 stores input data received from a user via a user interface (such as component 204 in FIG. 2), and/or information received from other components of demand response system 100 (shown in FIG. 1).

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a processor or other computer system, to carry out all or some of the steps to perform the methods or create the apparatuses discussed herein. A computer-usable medium may, in general, be a recordable medium (for example, floppy disks, hard drives, compact disks, EEPROMs, or memory cards) or may be a transmission medium (for example, a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The computer system can contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Thus, while there have shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for aggregate load management, comprising:
   determining whether a load capacity limit within a utility power network will be exceeded;
   selecting an aggregated demand reduction target to remain within capacity bounds if the load capacity limit is to be exceeded;
   selecting a demand reduction strategy;
   sending a first control signal that includes a first pulse width modulation level to a first controller in at least a first load component of the utility system based on the aggregated demand reduction target; and
   sending a second control signal that includes a second pulse width modulation level different than the first pulse width modulation level to a second controller in at least a second load component of the utility system based on the aggregated demand reduction target,
   wherein respective magnitudes of the first and second pulse width modulation levels are based on the strategy selected, load levels at the first and second load components, types of loads at the first and second load components, availability of loads suitable for reduction at the first and second load components, and a local need for load reduction at the first and second load components, and
   wherein the first and second controllers include respective randomization algorithms to randomize on and off times of duty cycles for respective loads in the first and second load components over a control period.

2. The method of claim 1, further comprising:
   monitoring an aggregate load of the first and second load components of the utility system to determine if the target is achieved; and
   sending an updated control signal to at least one of the first and second load components of the utility system if the target is not achieved, until the target is achieved.

3. The method of claim 1, wherein the aggregated demand reduction target comprises at least one of a local demand reduction target and a global demand reduction target.

4. The method of claim 1, wherein the load capacity limit within the utility power network comprises at least one of a local load capacity limit and a global load capacity limit.

5. The method of claim 1, wherein at least one of the first load component and the second load component of the utility system comprises a household or a building equipped with one or more energy controllers with one or more types of loads.

6. The method of claim 1, wherein determining whether the load capacity limit within the utility power network will be exceeded comprises analyzing at least one of generation capacity, transmission and distribution equipment capacity, geographic and power network topology information, component load information provided by a plurality of controllers, rate structure information, weather predictions and past history for the utility system.

7. The method of claim 1, wherein the demand reduction strategy is based on a uniform reduction amongst one or more loads in at least one of the first and second load components of the utility system.

8. The method of claim 1, wherein the demand reduction strategy is based on a magnitude of current component loads, wherein one or more comparatively larger loads are targeted for comparatively larger reductions, as compared to one or more smaller loads.

9. The method of claim 1, wherein the demand reduction strategy is based on geographic or network topology.

10. The method of claim 1, wherein the demand reduction strategy is based on a type of rate agreement with each component.

11. The method of claim 1, wherein the demand reduction strategy is based on a type of load to be reduced as selected by a consumer, wherein the consumer selects, in at least one of the first controller and the second controller, a preference of one or more loads to be controlled from a highest priority to a lowest priority.

12. The method of claim 1, further comprising:
   obtaining a level and a nature of at least one load in the utility system via an advanced metering infrastructure system.

13. The method of claim 1, further comprising:
   obtaining a level and a nature of at least one load in the utility system via a communication path using at least one of a wireless carrier, a power line carrier, and the Internet.

14. The method of claim 1, further comprising:
   performing a controlled system load restoration at an end of a demand reduction period.

15. A system for aggregate load management, comprising:
   at least one distinct software module, each distinct software module being embodied on a tangible computer-readable recordable medium;
   a memory; and
   at least one processor coupled to the memory and operative for:
      determining whether a load capacity limit within a utility power network will be exceeded;
      selecting an aggregated demand reduction target to remain within capacity bounds if the load capacity limit is to be exceeded;
      selecting a demand reduction strategy;
      sending a first control signal that includes a first pulse width modulation level to a first controller in at least a first load component of the utility system based on the aggregated demand reduction target; and
      sending a second control signal that includes a second pulse width modulation level different than the first pulse width modulation level to a second controller in at least a second load component of the utility system based on the aggregated demand reduction target, wherein respective magnitudes of the first and second pulse width modulation levels are based on the strategy selected, load levels at the first and second load components, types of loads at the first and second load components, availability of loads suitable for reduction at the first and second load components, and a local need for load reduction at the first and second load components, and wherein the first and second controllers include respective randomization algorithms to randomize on and off times of duty cycles for respective loads in the first and second load components over a control period.

16. The system of claim 15, wherein the at least one processor coupled to the memory is further operative for:

monitoring an aggregate load of the first and second load components of the utility system to determine if the target is achieved; and sending an updated control signal to at least one of the first and second load components of the utility system if the target is not achieved, until the target is achieved.

17. The system of claim 15, wherein the at least one processor coupled to the memory operative for determining whether the load capacity limit within the utility power network will be exceeded is further operative for analyzing at least one of generation capacity, transmission and distribution equipment capacity, geographic and power network topology information, component load information provided by a plurality of controllers, rate structure information, weather predictions and past history for the utility system.

18. The system of claim 15, wherein the demand reduction strategy is based on type of load to be reduced as selected by a consumer, wherein the consumer selects, in at least one of the first controller and the second controller, a preference of one or more loads to be controlled from a highest priority to a lowest priority.

19. The system of claim 15, wherein the at least one processor coupled to the memory is further operative for:

performing a controlled system load restoration at an end of a demand reduction period.

20. A method for load management at a component level, comprising:

receiving, via a first controller in a first load component, a first control signal from a utility system based on a utility demand reduction strategy;

converting the first control signal into a randomized pulse width modulation control of the first load component in accordance with the first control signal and a randomization algorithm included in the first controller to randomize on and off times of duty cycles for respective loads in the first load component over a control period;

receiving, via the first controller in the first load component, an updated control signal from the utility system based on utility system monitoring of an aggregate load of at least one component of the utility system; and converting the updated control signal into a pulse width modulation control of the first load component in accordance with the updated control signal and the randomization algorithm to randomize on and off times of duty cycles for respective loads in the first load component over another control period;

wherein the first control signal includes a first pulse width modulation level, the first pulse width modulation level being different than a second pulse width modulation level of a second control signal received at a second controller for a second load component in the utility system, wherein respective magnitudes of the first and second pulse width modulation levels are based on the utility demand reduction strategy, load levels at the first and second load components, types of loads at the first and second load components, availability of loads suitable for reduction at the first and second load components, and a local need for load reduction at the first and second load components.

* * * * *